US012783874B2

(12) United States Patent
Choi et al.

(10) Patent No.: US 12,783,874 B2
(45) Date of Patent: Nov. 3, 2026

(54) METHOD AND APPARATUS WITH DISTRIBUTED TRAINING OF NEURAL NETWORK

(71) Applicant: SAMSUNG ELECTRONICS CO., LTD., Suwon-si (KR)

(72) Inventors: Changin Choi, Suwon-si (KR); Gunhee Kim, Suwon-si (KR); Yongdeok Kim, Hwaseong-si (KR); Myeong Woo Kim, Suwon-si (KR); Seungwon Lee, Hwaseong-si (KR); Narankhuu Tuvshinjargal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1008 days.

(21) Appl. No.: 17/862,881

(22) Filed: Jul. 12, 2022

(65) Prior Publication Data

US 2023/0169333 A1 Jun. 1, 2023

(30) Foreign Application Priority Data

Nov. 30, 2021 (KR) ........................ 10-2021-0169069

(51) Int. Cl.
*G06N 3/08* (2023.01)

(52) U.S. Cl.
CPC ...................................... *G06N 3/08* (2013.01)

(58) Field of Classification Search
CPC ............ G06N 3/08; G06N 3/09; G06N 3/098; G06N 3/063; G06N 3/084; G06N 3/082; G06N 3/045
See application file for complete search history.

(56) References Cited

U.S. PATENT DOCUMENTS 12,072,954 B1 * 8/2024 Li ........................ G06F 18/2148
2019/0205745 A1 7/2019 Sridharan et al.
(Continued)

FOREIGN PATENT DOCUMENTS

CN 111210020 A 5/2020
JP 2020-3848 A 1/2020
(Continued)

OTHER PUBLICATIONS

Sun, Peng, et al. "Optimizing network performance for distributed dnn training on gpu clusters: Imagenet/alexnet training in 1.5 minutes." arXiv preprint arXiv:1902.06855 (2019). (Year: 2019).*
(Continued)

*Primary Examiner* — Jeremy L Stanley
*Assistant Examiner* — Humaira Zahin Mauni
(74) *Attorney, Agent, or Firm* — NSIP Law

(57) ABSTRACT

Disclosed are a training method and apparatus for distributed training of a neural network, the training apparatus including processors configured to perform distributed training, wherein each of the processors is further configured to perform a forward direction operation for layers of the neural network, determine a loss of the neural network based on the forward direction operation, determine a local gradient for each layer of the neural network by performing a backward direction operation for the layers of the neural network based on the loss, determine whether to perform gradient clipping for a local gradient determined for a previous layer, in response to determining a local gradient for a current layer through the backward direction operation, determine an aggregated gradient based on the backward direction operation and the gradient clipping performed by each of the processors, and update parameters of the neural network based on the aggregated gradient.

22 Claims, 6 Drawing Sheets

(56) References Cited

U.S. PATENT DOCUMENTS

| | | | | |
|---|---|---|---|---|
| 2021/0295168 | A1* | 9/2021 | Xu | G06N 3/084 |
| 2022/0318412 | A1* | 10/2022 | Guo | G06F 17/18 |
| 2024/0127586 | A1* | 4/2024 | Brock | G06N 3/047 |

FOREIGN PATENT DOCUMENTS

| | | | |
|---|---|---|---|
| KR | 10-2020-0023155 | A | 3/2020 |
| KR | 10-2020-0109917 | A | 9/2020 |
| KR | 10-2023-0063247 | A | 5/2023 |

OTHER PUBLICATIONS

Lin, Yujun, et al. "Deep gradient compression: Reducing the communication bandwidth for distributed training." arXiv preprint arXiv:1712.01887v3 (2020). (Year: 2020).*

Zhang, Bohang, et al. "Improved analysis of clipping algorithms for non-convex optimization." Advances in Neural Information Processing Systems 33 (2020): 15511-15521. (Year: 2020).*

Yook, Dongsuk, et al. "A survey on parallel training algorithms for deep neural networks." *The Journal of the Acoustical Society of Korea*. vol. 39, No. 6 (2020). pp. 505-514.

Lin, Yujun, et al. "Deep gradient compression: Reducing the communication bandwidth for distributed training." *arXiv preprint arXiv:1712.01887* (2017). pp. 1-14.

Chen, Kai, et al. "Scalable training of deep learning machines by incremental block training with intra-block parallel optimization and blockwise model-update filtering." *2016 ieee international conference on acoustics, speech and signal processing* (*icassp*). IEEE, 2016. pp. 5880-5884.

Zhang, Yichi, et al. "Precision gating: Improving neural network efficiency with dynamic dual-precision activations." *arXiv preprint arXiv:2002.07136* (2020). pp. 1-13.

Xu, Shoukai, et al. "Generative low-bitwidth data free quantization." *European Conference on Computer Vision*. Springer, Cham, 2020. pp. 1-18.

* cited by examiner

METHOD AND APPARATUS WITH DISTRIBUTED TRAINING OF NEURAL NETWORK

CROSS-REFERENCE TO RELATED APPLICATIONS

This application claims the benefit under 35 USC § 119(a) of Korean Patent Application No. 10-2021-0169069, filed on Nov. 30, 2021, in the Korean Intellectual Property Office, the entire disclosure of which is incorporated herein by reference for all purposes.

BACKGROUND

1. Field

The following description relates to performing distributed training of a neural network.

2. Description of Related Art

Research is being conducted for recognizing and classifying an object from an image through a recognition model such as a classifier. The recognition model may be based on a neural network that may generate mapping between input information and output information, and may have a generalization capability to infer a relatively correct output with respect to input information that has not been used for training. The neural network may be used to output a recognition result corresponding to an input pattern of input information. The neural network has a capability to generate mapping between an input pattern and an output pattern through learning and generate a relatively correct output value for an input pattern that has not been used for learning.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an apparatus to perform distributed training of a neural network, the apparatus including a plurality of processors configured to perform distributed training, wherein each of the plurality of processors is further configured to perform a forward direction operation for layers of the neural network, determine a loss of the neural network based on a result of the forward direction operation, determine a local gradient for each layer of the neural network by performing a backward direction operation for the layers of the neural network based on the loss, determine whether to perform gradient clipping for a local gradient determined for a previous layer, in response to determining a local gradient for a current layer through the backward direction operation, determine an aggregated gradient based on results of the backward direction operation and the gradient clipping performed by each of the plurality of processors, and update parameters of the neural network based on the aggregated gradient.

The plurality of processors may be configured to determine whether to perform the gradient clipping for a first local gradient of a first layer of the neural network, in response to determining a second local gradient for a second layer after determining the first local gradient.

The plurality of processors may be configured to transmit a final local gradient for the previous layer to another processor of the plurality of processors, in response to a gradient clipping check process for the local gradient for the previous layer being completed.

The plurality of processors may be configured to simultaneously determine the local gradient for the current layer and to transmit the final local gradient for the previous layer to the another processor.

The training apparatus may be configured to determine an average value of local gradients for the each layer of the neural network determined by each of the plurality of processors to be the aggregated gradient.

The plurality of processors may be configured to determine whether to perform the gradient clipping based on the local gradient determined for the previous layer and a threshold.

The plurality of processors may be configured to change the local gradient for the previous layer to a value corresponding to the threshold, in response to a determination to perform the gradient clipping.

The gradient clipping may be performed by a processor other than the plurality of processors.

Each of the plurality of processors may be configured to perform the gradient clipping based on any one or any combination of a variance value, a momentum value, and a parameter norm value.

The plurality of processors may include graphics processing units (GPUs) configured to perform parallel processing.

In another general aspect, there is provided a method for training a neural network, performed by a training apparatus comprising a plurality of processors, the method including performing, by each of the plurality of processors, a forward direction operation for layers of the neural network, determining, by each of the plurality of processors, a loss of the neural network based on a result of the forward direction operation, determining, by each of the plurality of processors, a local gradient for each layer of the neural network by performing a backward direction operation for the layers of the neural network based on the loss, determining an aggregated gradient based on the local gradient, and updating parameters of the neural network based on the aggregated gradient, wherein the determining of the local gradient for each of the layers comprises determining whether to perform gradient clipping for a local gradient for a previous layer, in response to determining a local gradient for a current layer through the backward direction operation, and wherein the determining of the aggregated gradient comprises determining the aggregated gradient based on results of the backward direction operation and the gradient clipping performed by each of the plurality of processors.

The forward direction operation, the backward direction operation, and the gradient clipping may be performed by each of the plurality of processors in parallel.

The determining of whether to perform the gradient clipping may include determining whether to perform the gradient clipping for a first local gradient for a first layer of the neural network, in response to determining a second local gradient for a second layer of the neural network.

The determining of the local gradient for each of the layers may include transmitting a final local gradient for the previous layer to another processor of the plurality of processors, in response to a gradient clipping check process for the local gradient for the previous layer being completed.

The determining of the local gradient for the current layer and the transmitting of the final local gradient determined for the previous layer to the another processor are simultaneously performed.

The determining of the aggregated gradient may include determining an average value of local gradients for the each layer determined by each of the plurality of processors to be the aggregated gradient.

The determining of whether to perform the gradient clipping may include determining whether to perform the gradient clipping based on the local gradient determined for the previous layer and a threshold.

The training method may include changing the local gradient determined for the previous layer to a value corresponding to the threshold, in response to a determination to perform the gradient clipping.

The gradient clipping may be performed based on any one or any combination of a variance value, a momentum value, and a parameter norm value.

In another general aspect, there is provided a method, performed by one or more processors, for distributed training of a neural network, the method including performing, by each of the one or more processors, a forward direction operation for layers of the neural network to obtain result data, determining a loss of the neural network based on difference between the result data and validation data, determining, by each of the one or more processors, respective local gradients for the layers of the neural network based on the loss, checking whether to perform gradient clipping for a previous layer, in response to determining a local gradient for a current layer of the layers, transmitting a final local gradient for the previous layer to another processor of the one or more processors, in response to the checking being completed, generating an aggregated gradient based on the final local gradient, and updating parameters of the neural network based on the aggregated gradient.

The performing of the forward direction operation, the determining of the loss, the determining of the respective local gradients, the checking of whether to perform gradient clipping may be performed by the one or more processors in parallel.

The checking of whether to perform the gradient clipping for the previous layer may include clipping a local gradient of the previous layer, in response to the local gradient of the previous layer being greater than a high threshold or lesser than a low threshold.

The generating of the aggregated gradient may include determining the aggregated gradient based on the average value of the final local gradients received from the one or more processors for the respective layer.

Other features and aspects will be apparent from the following detailed description, the drawings, and the claims.

Figure 1:
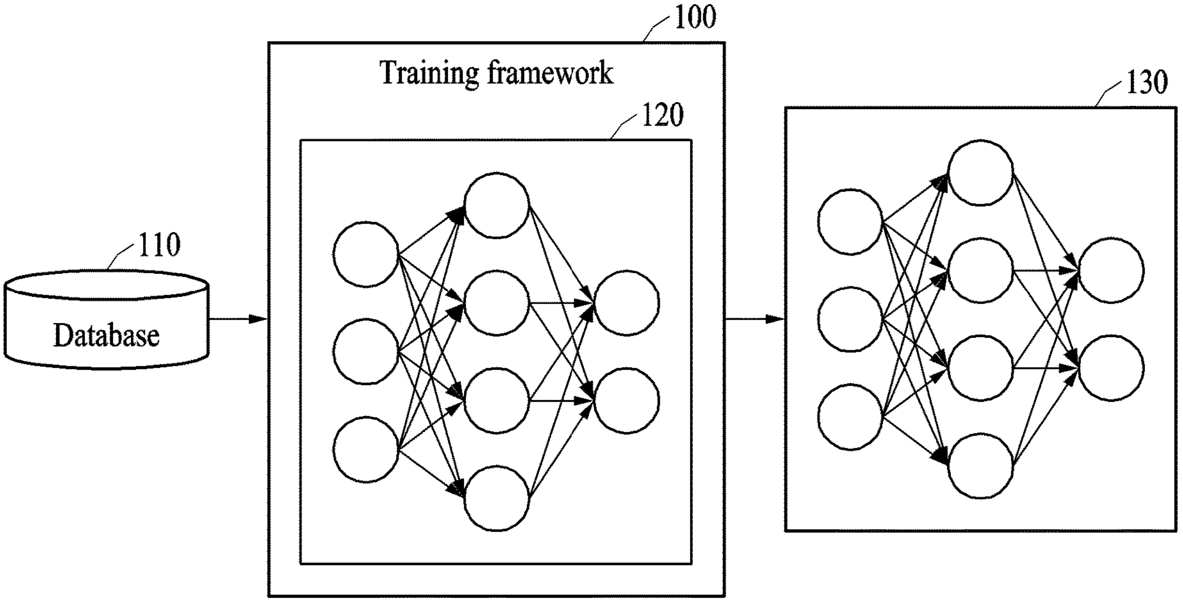
FIG. 1 illustrates an example of a training framework for performing distributed training of a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application Although terms such as "first," "second," and "third", A, B, C, (a), (b), (c), or the like may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/including" and/or "includes/including" and "have" when used herein, specify the presence of stated features, integers, steps, operations, elements, and/or components, but do not preclude the presence or addition of one or more other features, integers, steps, operations, elements, components and/or groups thereof. As used herein, the term "and/or" includes any one and any combination of any two or more of the associated listed items.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

The use of the term "may" herein with respect to an example or embodiment (e.g., as to what an example or embodiment may include or implement) means that at least one example or embodiment exists where such a feature is included or implemented, while all examples are not limited thereto.

Hereinafter, examples will be described in detail with reference to the accompanying drawings. When describing the examples with reference to the accompanying drawings, like reference numerals refer to like elements and a repeated description related thereto will be omitted.

FIG. 1 illustrates an example of performing distributed training of a neural network.

Referring to FIG. 1, a training framework 100 generates a trained neural network 130 by training a neural network 120 through machine learning. Training of the neural network 120 is an optimization process of finding a point where energy of the neural network is at minimum by training the neural network 120 based on prepared data (e.g., training data). Operations to be performed in the training framework 100 may be performed by a training apparatus (e.g., a training apparatus 200 of FIG. 2) described herein.

The neural network 120 may refer to a general model that has an ability to solve a problem or perform tasks, as non-limiting examples, where nodes form the network through connections and other parameter adjustment through training.

The neural network 120 may be a machine learning model structure. In another example, a neural network layer may extract feature data from input data and provide an inference based on the feature data. The feature data may also be data associated with a feature obtained by abstracting input data. The neural network 120 may map input data and output data in a nonlinear relationship based on deep learning, to generate such inferences. Deep learning, such as, through back propagation for multiple hidden layers of a neural network may generate a trained neural network for various purposes or tasks, such as speech recognition or speech transliteration from a big data set, may map input data and output data to each other through supervised and/or unsupervised learning, as only examples.

The neural network 120 is yet to be trained (or an untrained neural network), in which an operation, parameters (e.g., connection weights), and the like for each layer are not set. In an example, training an artificial neural network may indicate determining and adjusting weights and biases between layers or weights and biases among a plurality of nodes belonging to different layers adjacent to one another, as only non-limiting examples of such parameters.

The neural network 120 may include a plurality of neural network layers (or simply "layers"). The neural network 120 may be, for example, a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more thereof, but examples of which are not limited to the foregoing examples. The neural network 120 may include a hardware structure that may be implemented through execution of instructions by a processor.

The training framework 100 may perform machine learning for the neural network 120 based on training data stored in a database 110. For each single training process (i.e., iteration), batch size training data may be input to the neural network 120, and the neural network 120 may output result data calculated based on the input training data. In an example, the training framework 100 may perform training according to a stochastic gradient descent scheme based on the result data of the neural network 120 to minimize a value of a loss function according to each domain task.

In an example, the training framework 100 may train the neural network 120 through supervised learning. The training framework 100 may perform training based on an adjustment algorithm such as the stochastic gradient descent scheme, and the loss function. The training data used for the training may include input data to be input to the neural network and validation data corresponding to the input data. The neural network 120 may process the input data included in the training data to output the result data. The training framework 100 may determine a neural network loss based on a result of comparison between the result data output from the neural network 120 and the validation data, and update parameters, such as, weights, of the neural network 120 to minimize the neural network loss. The training framework 100 may repetitively perform the above process for each of the training data to generate the trained neural network 130.

The training framework 100 may generate an optimal neural network (e.g., the trained neural network 130) according to a given purpose (e.g., object classification, object recognition, speech recognition, etc.) through the training process. In an example, the training framework 100 may train the neural network 120 according to an error backpropagation scheme. The error backpropagation scheme is to adjust the parameters of the neural network 120 to minimize an error by propagating, in a backward direction for the layers, an error (or a loss) calculated based on a difference between a result value calculated in a forward direction for the layers included in the neural network 120 and a target value. Here, the forward direction is a direction from an input layer to an output layer of the neural network 120, and the backward direction is a direction from the output layer to the input layer.

In performing training, the training framework 100 may perform distributed training using a plurality of processors. The plurality of processors may be a processing devices implemented by hardware including a circuit having a physical structure to perform operations. For example, the operations may be implemented by execution of computer-readable instructions that configure the processing devices to perform any one, or any combination, of the operations described herein.

For example, the hardware-implemented data processing devices may include a microprocessor, a central processing unit (CPU), a graphics processing units (GPUs), a processor core, a multi-core processor, a multiprocessor, an application-specific integrated circuit (ASIC), and a field-programmable gate array (FPGA). Further details regarding the plurality of processors is provided below.

Through the distributed training, the training of the neural network may be performed faster. The plurality of processors may perform parallel processing and perform distributed processing for the training data by batch. Distributed training is to train a neural network throughout multiple nodes according to various parallelism and synchronization schemes. The parallelism schemes may be classified into data parallelism and model parallelism, and the model parallelism may be classified, according to a performing scheme, into pipeline parallelism, tensor parallelism, hybrid parallelism into which multiple schemes are combined, and the like. The synchronization schemes may be classified into bulk synchronization parallel (BSP), state synchronization parallel (SSP), asynchronous parallel (ASP), and the like. When the neural network 120 is trained in a distributed manner with the stochastic gradient descent scheme, each of the processors may calculate a gradient for the loss function using the training data by batch. In an example, before updating the neural network 120 using the stochastic gradient descent scheme according to each synchronization scheme, each of the processors may exchange the calculated gradient for each of the layers and/or weights of the neural network 120.

In parallel processing the neural network 120 through the distributed training, gradient clipping may be performed to stably update the neural network 120 and achieve fast convergence. Gradient clipping is a scheme of reducing an exploding gradient issue by clipping a gradient for a gradient value to not exceed a predetermined value in an error backpropagation process. The gradient clipping may be performed based on a threshold, which may refer to, for example, if a calculated gradient is greater than a threshold, clipping the calculated gradient according to the threshold so that a maximum value of the gradient is limited to the threshold. In an example, the value of the gradient for which the gradient clipping is performed may be adjusted to the threshold. There may be a lower threshold and/or an upper threshold for a threshold for gradient clipping. Here, the lower threshold may be referred to as a minimum clip value, and the upper threshold may be referred to as a maximum clip value. The gradient clipping may include gradient scaling.

The distributed training is a technique to reduce a training time for the neural network 120. However, during the distributed training, communication for gradient exchange between the processors significantly affects the training time. The training framework 100 may reduce the time needed for the distributed training by not performing the gradient clipping after all the processors exchange gradients in the distributed training process but by determining whether to perform the gradient clipping each time a gradient for each layer (a local gradient) is determined and immediately transmitting a gradient for which a gradient clipping check process is completed to another processor. The training framework 100 may perform the distributed training faster by simultaneously performing an operation of determining the gradient in the backward direction for the layers of the neural network 120 according to the error backpropagation scheme and the stochastic gradient descent scheme and an operation of transmitting the gradient in which the gradient clipping check process is completed. According to examples, calculation of the gradient for each layer of the neural network 120 and communication for transmitting the gradient calculated for each layer may overlap.

Figure 2:
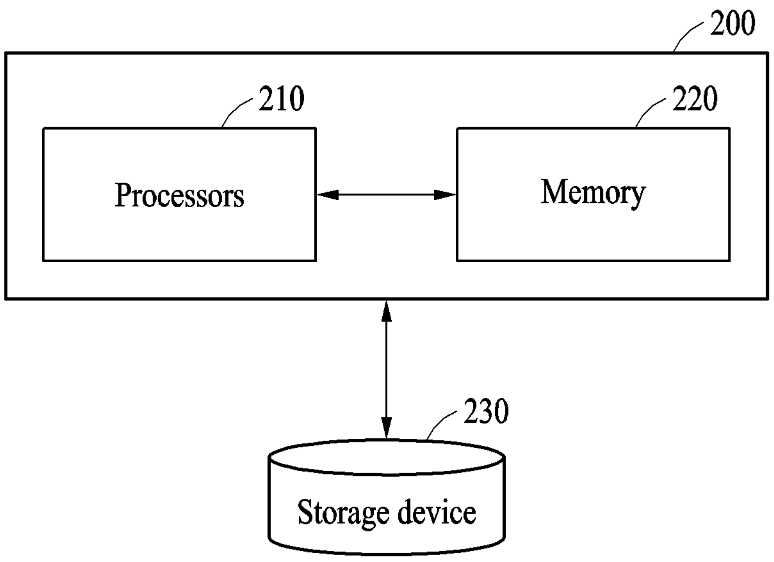
FIG. 2 illustrates an example of a configuration of a training apparatus.

FIG. 2 illustrates an example of a configuration of a training apparatus.

Referring to FIG. 2, a training apparatus 200 is an apparatus for training a neural network (e.g., the neural network 120 of FIG. 1) and may perform distributed training of the neural network. The training apparatus 200 may perform the training framework 100 illustrated in FIG. 1 and a distributed training framework 300 illustrated in FIG. 3, and may perform one or more operations described in this specification or illustrated in the drawings in relation to the training of the neural network.

The training apparatus 200 may include processors 210 and a memory 220. A storage device 230 may store training data. The training apparatus 200 may perform parallel processing for the distributed training using the processors 210.

The processor 210 may be a processing device implemented by hardware including a circuit having a physical structure to perform operations. For example, the operations may be implemented by execution of computer-readable instructions that configure the processing device to perform any one, or any combination, of the operations described.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA). Further details regarding the processor 610 is provided below.

The memory 220 may store various data used by components (e.g., the processors 210) of the training apparatus 200. The various data may include, for example, instructions that are executed by the processors 210 and input data or output data for a command related thereto. The memory 220 may include at least one of a volatile memory and a non-volatile memory. The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM(CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory. Further details regarding the memory 220 is provided below.

The processors 210 may execute instructions for performing the operations of the training apparatus 200. The processors 210 may execute, for example, instructions, to control at least one other component (e.g., a hardware or instructions stored in the memory) of the training apparatus 200 connected to the processors 210, and may perform various data processing tasks or operations.

According to an example, as at least part of the various data processing or operations, the processors 210 may store commands or data in the memory 220, process the commands or data stored in the memory 220, and store result data in the memory 220 or the storage device 230. The processors 210 may include a main processor (e.g., a central processing unit or an application processor) or an auxiliary processor (e.g., a GPU and a neural processing unit (NPU)) that is operable independently of, or in conjunction with the main processor.

The processors 210 may perform the distributed training. In an example, the processors 210 may include GPUs for performing the parallel processing. The processors 210 may perform training distributed according to an error backpropagation scheme and a stochastic gradient descent scheme. The training data by batch may be input to each of the processors 210, and each of the processors 210 may perform a forward direction (e.g., a direction from an input layer to an output layer) operation for layers of the neural network. Each of the processors 210 may determine a neural network loss of the neural network based on a result of the forward direction operation. The neural network loss may be determined based on a difference between result data of the neural network that processed input data and a desired validation data. In an example, to determine the neural network loss, a predefined loss function may be used.

Each of the processors 210 may determine a local gradient for each of the layers of the neural network by performing a backward direction (e.g., a direction from the output layer to the input layer) operation for the layers of the neural network based on the neural network loss. A local gradient is a gradient determined for one or some of layers, not all layers.

Each of the processors 210 may determine, in an operation of determining a local gradient for a current layer through the backward direction operation, whether to perform gradient clipping for a local gradient determined for a previous layer (e.g., an upper layer for which a backward direction operation is performed at a previous time). For example, each of the processors 210 may determine, when determining a second local gradient for a second layer after determining a first local gradient for a first layer of the neural network, whether to perform the gradient clipping for the first local gradient. Here, the first layer is an upper layer than the second layer. In an example, each of the processors 210 may determine whether to perform the gradient clipping based on the local gradient determined for the previous layer and a threshold. The threshold may be identical for local gradients for all the respective layers, or depending on a layer, the threshold serving as a reference may vary.

In response to a determination to perform the gradient clipping, each of the processors 210 may perform the gradient clipping for the local gradient. For example, through the gradient clipping, the local gradient determined for the previous layer may be changed to a value corresponding to the threshold. Each of the processors 210 may perform the gradient clipping using any one or any combination of a variance value, a momentum value, and a parameter norm value. According to an example, the gradient clipping may be performed by another processor other than the processors 210 for performing the parallel processing.

In response to a gradient clipping check process for the local gradient for the previous layer being completed, each of the processors 210 may transmit a final local gradient (a local gradient with or without gradient clipping applied according to a result of gradient clipping check) determined for the previous layer to another processor. Each of the processors 210 may simultaneously perform the operation of determining the local gradient for the current layer and the operation of transmitting the final gradient determined for the previous layer to another processor.

The training apparatus 200 may determine an aggregated gradient based on results of the backward direction operation and the gradient clipping performed by each of the processors 210. For example, the training apparatus may determine an average value of local gradients for the respective layers determined by each of the processors 210 for each layer of the neural network to be the aggregated gradient. The aggregated gradient may be determined by all the processors 210, some of the processors 210, or another processor other than the processors 210. For example, the processors 210 may exchange final local gradients with each other and determine the aggregated gradient based on the average value of the final local gradients received from other processors for the respective layers. The training apparatus 200 may update parameters (e.g., weights) of the neural network based on the aggregated gradient. The training apparatus 200 may adjust the parameters of the neural network to minimize an error of the result data output by the neural network.

Figure 3:
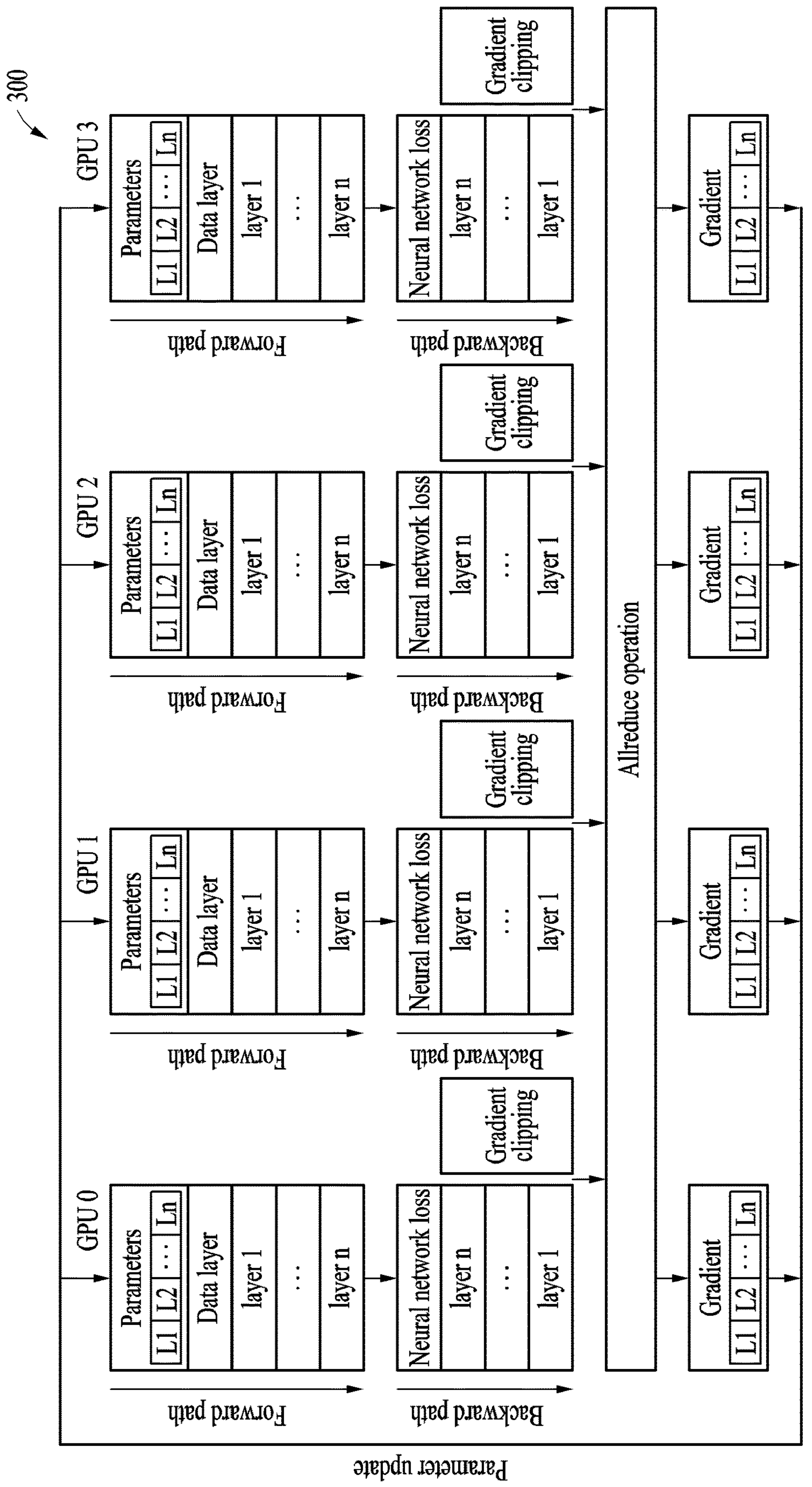
FIG. 3 illustrates an example of a distributed training framework for distributed training of a neural network.

FIG. 3 illustrates an example of a distributed training framework for distributed training of a neural network.

In an example of FIG. 3, it is assumed that a distributed training framework 300 performs distributed processing by four processors, for example GPUs (GPU0, GPU1, GPU2, and GPU3). Each of the GPUs may perform an operation in a forward path (or forward pass) for layers of the neural network based on parameters for the respective layers (L1, L2, . . . , Ln) of the neural network. Each of the GPUs may calculate a neural network loss based on a result of the operation in the forward path, and may perform an operation in a backward path (or backward pass) for the layers of the neural network based on the neural network loss. Each of the GPUs may determine a local gradient for each of the layers by propagating an error resulting from the neural network loss in a direction from an upper layer (layer n) to a lower layer (layer 1) of the layers of the neural network according to an error backpropagation scheme.

In performing the distributed training, each of the GPUs may input training data by a batch unit into the neural network in the forward path direction and obtain an output and then perform a gradient clipping check process for the local gradient to minimize a loss of task to be learned when propagating in the backward path direction, and perform a local gradient exchange process between the GPUs. Each of the GPUs may compare the local gradient for each of the layers with a threshold and, if the local gradient is greater than the threshold, perform a gradient clipping process of limiting the local gradient for the corresponding layer to the threshold.

The gradient clipping process may start from the backward direction operation. When a backward direction operation for the upper layer is completed and the local gradient therefor is determined, for the local gradient for the upper layer, the gradient clipping check process and the local gradient exchange process may be performed. The gradient clipping check process and the local gradient exchange process may be simultaneously performed with a backward direction operation process for a lower layer following the upper layer. The backward path operation and a communication among the GPUs may be performed simultaneously. Accordingly, the distributed training may speed up.

In the distributed training framework 300, through an allreduce(or all-reduce) operation, local gradient values for the respective layers of each of the GPUs may be synchronized. In order to calculate an average value of the local gradients for the respective layers, a communication task called allreduce operation may be performed. An aggregated gradient may be determined for each of the layers through the allreduce operation, and the aggregated gradient may be used for updating the parameters of the neural network according to an optimization function that optimizes the neural network. An aggregated gradient which is a gradient for all layers may be distinguished from a local gradient which is a gradient for an individual layer, and may simply be referred to as a gradient.

Figure 4:
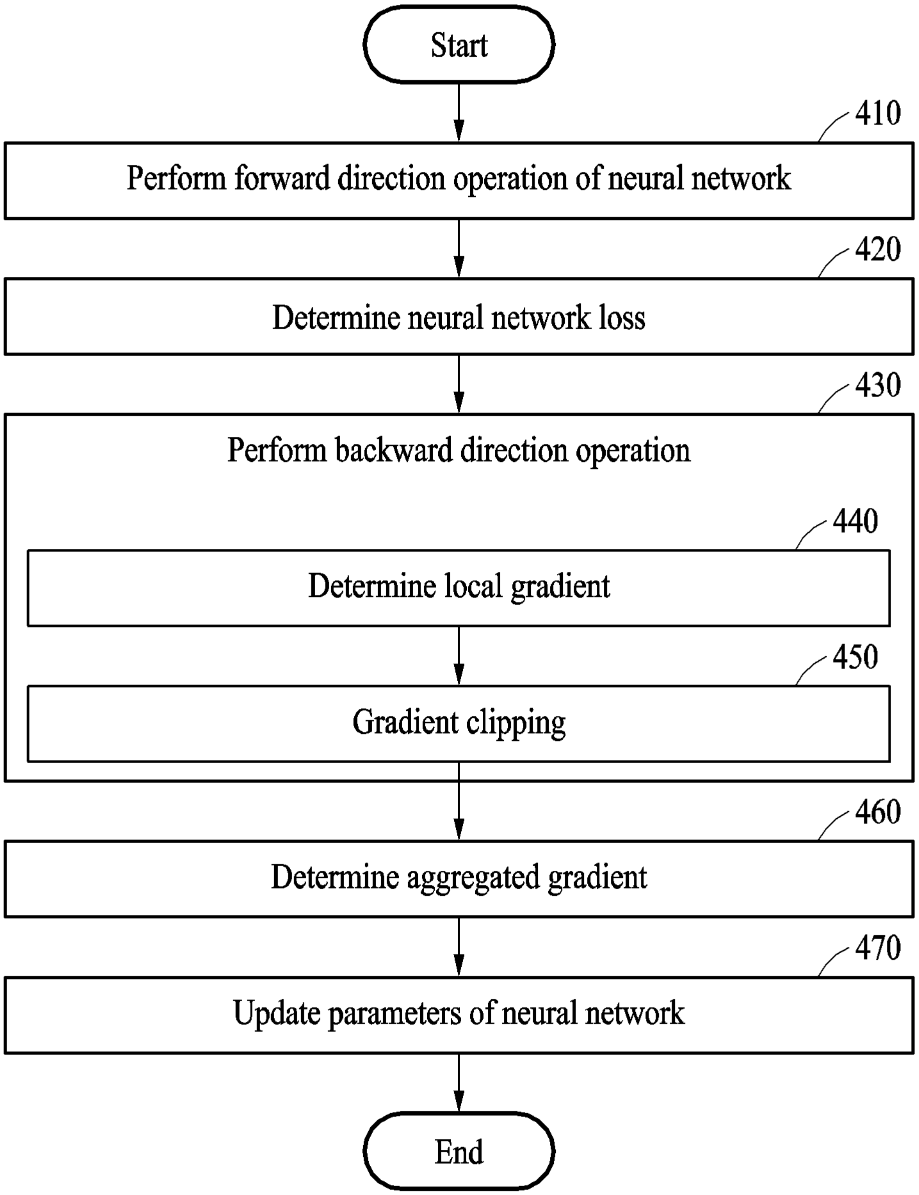
FIG. 4 illustrates an example of operations of a training method for performing distributed training of a neural network.

FIG. 4 illustrates an example of operations of a training method for performing distributed training of a neural network. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions.

For example, the operations of the training method may be performed by the training apparatus 200 of FIG. 2. Operation 410, operation 420, operation 430, operation 440, and operation 450 may be performed in parallel by each of a plurality of processors (e.g., the processors 210 of FIG. 2) included in the training apparatus. The training method may be performed based on an error backpropagation scheme and a stochastic gradient descent scheme. In addition to the description of FIG. 4 below, the descriptions of FIGS. 1-3 are also applicable to FIG. 4, and are incorporated herein by reference. Thus, the above description may not be repeated here.

Referring to FIG. 4, in operation 410, the training apparatus may perform a forward direction operation for layers of a neural network according to the error backpropagation scheme. Training data may be input to the neural network, and the processors included in the training apparatus may process the forward direction operation for the neural network in parallel.

In operation 420, the training apparatus may determine a neural network loss of the neural network based on a result of the forward direction operation. The training apparatus may determine the neural network loss based on a difference between result data of the neural network that processed input data and desired validation data.

In operation 430, the training apparatus may perform a backward direction operation for the layers of the neural network based on the neural network loss. While the backward direction operation is performed, the training apparatus may determine a local gradient for each of the layers in operation 440. When a local gradient for a current layer is determined, the training apparatus may perform a gradient clipping check to determine whether to perform the gradient clipping for the local gradient, in operation 450. The training apparatus may determine, when determining a second local gradient for a second layer after determining a first local gradient for a first layer of the neural network, whether to perform the gradient clipping for the first local gradient. For example, the training apparatus may determine, in the operation of determining the local gradient for the current layer through the backward direction operation, whether to perform the gradient clipping for a local gradient determined for a previous layer. In an example, the training apparatus may determine whether to perform the gradient clipping based on the local gradient determined for the previous layer and a threshold.

When it is determined to perform the gradient clipping, the training apparatus may perform the gradient clipping for the local gradient based on the threshold. In an example, when it is determined to perform gradient clipping, the training apparatus may change the local gradient determined for the previous layer to a value corresponding to the threshold. In an example, the gradient clipping may be performed based on any one or any combination of, for example, a variance value, a momentum value, and a parameter norm value. When the gradient clipping check process for the local gradient for the previous layer is completed, the training apparatus may transmit a final local gradient determined for the previous layer to another processor. The operation of determining the local gradient for the current layer and the operation of transmitting the final local gradient determined for the previous layer may be simultaneously performed.

In operation 460, the training apparatus may determine an aggregated gradient based on the local gradient. The training apparatus may determine the aggregated gradient based on results of the backward direction operation and the gradient clipping performed by each of the processors. The training apparatus, for example, may determine an average value of local gradients for the respective layers determined by each of the processors for each layer to be the aggregated gradient. In operation 470, the training apparatus may update parameters (e.g., weights) of the neural network based on the aggregated gradient.

The training apparatus may repetitively perform the above process for another training data, and may generate a desired target neural network by repetitively performing the above operations for each given training data.

Figure 5:
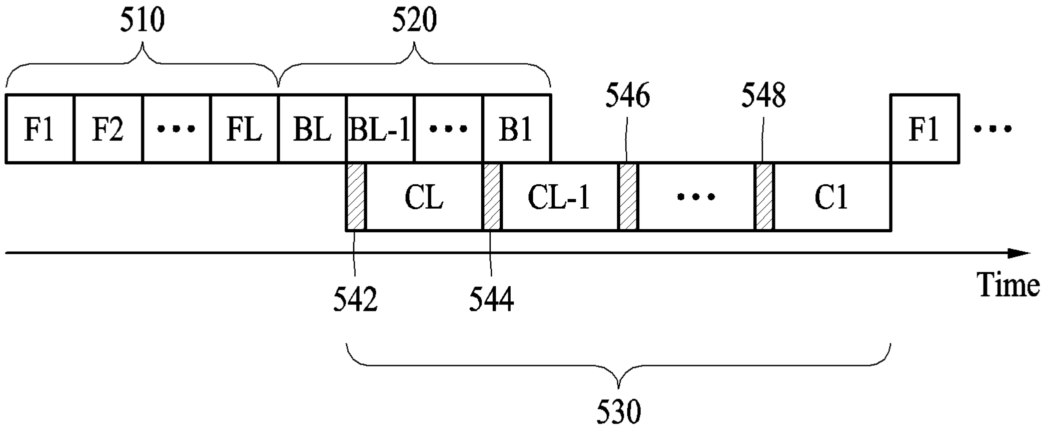
FIG. 5 illustrates an example of a point in time of performing local gradient clipping and local gradient exchange.

FIG. 5 illustrates an example of a point in time of performing local gradient clipping and local gradient exchange.

Referring to FIG. 5, in a time period 510, a forward direction operation for layers of a neural network (e.g., calculating operations from an input layer to an output layer of the neural network) may be performed. In FIG. 5, F1 refers to the forward direction calculating operation for a first layer (e.g., the input layer) of the neural network, F2 refers to the forward direction calculating operation for a second layer (e.g., a subsequent (hidden) layer to the input layer), and FL refers to the forward direction calculating operation for a last layer (e.g., the output layer). When the forward direction operation is completed, a neural network loss may be determined based on a result of the forward direction operation. In a time period 520, a backward direction operation for the layers of the neural network may be performed based on the neural network loss. In FIG. 5, BL refers to the backward direction calculating operation for the last layer (e.g., the output layer) of the neural network, BL-1 refers to the backward direction calculating operation for a second to last layer (e.g., a previous (hidden) layer of the output layer), and B1 refers to the backward direction calculating operation for the first layer (e.g., the input layer).

When the backward direction calculating operation for the last layer of the neural network is completed and a local gradient for the last layer is determined, a gradient clipping check process 542 for the corresponding local gradient may be performed. Also, according to a result of the gradient clipping check, a local gradient exchange process CL for the last layer with or without the gradient clipping applied may be performed between processors. Then, according to an order of the calculating operation for BL-1, . . . , B1, a gradient clipping check process 544, 546, and 548 and a local gradient exchange process CL-1, . . . , C1 may be performed sequentially. Then, the above processes may be performed repetitively for another training data.

As above, a time period 530 for the gradient clipping check process 542, 544, 546, and 548 and the local gradient exchange process may overlap the time period 520 for the backward direction operation. Through this overlapping processing, the distributed training may be performed faster.

Figure 6:
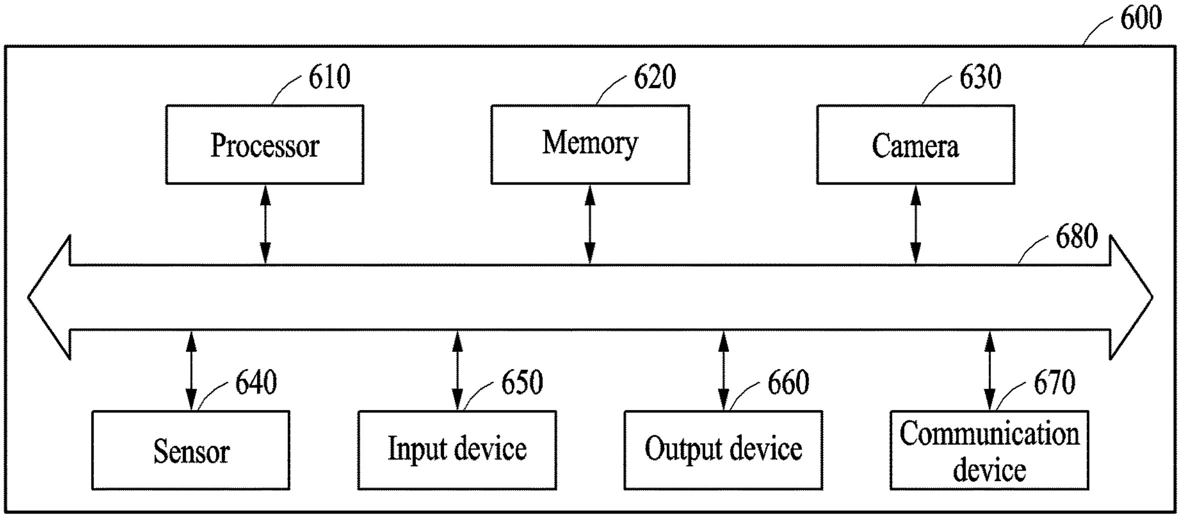
FIG. 6 illustrates an example of a configuration of an electronic device.

FIG. 6 illustrates an example of a configuration of an electronic device 600.

The electronic device 600 may be may be implemented as, or in, various types of computing devices, such as, a personal computer (PC), a data server, or a portable device. In an example, the portable device may be implemented as a laptop computer, a mobile phone, a smart phone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, a smart vehicle, an autonomous vehicle, or a smart device. In an example, the electronic device 600 may be a wearable device, such as, for example, an apparatus for providing augmented reality (AR) (hereinafter simply referred to as an "AR provision device") such as AR glasses, a head mounted display (HMD), a smart watch, and a product inspection device.

The electronic device 600 may include a processor 610, a memory 620, a camera 630, a sensor 640, an input device 650, an output device 660, and a communication device 670. At least some of the components of the electronic device 600 may be coupled mutually and exchange signals (e.g., commands or data) therebetween via an inter-peripheral communication interface 680 (e.g., a bus, general purpose input and output (GPIO), a serial peripheral interface (SPI), or a mobile industry processor interface (MIPI)).

The processor 610 may be a processing device implemented by hardware including a circuit having a physical structure to perform operations. For example, the operations may be implemented by execution of computer-readable instructions that configure the processing device to perform any one, or any combination, of the operations described.

For example, the hardware-implemented data processing device may include a microprocessor, a central processing unit (CPU), a processor core, a multi-core processor, a multiprocessor, an application-specific integrated circuit (ASIC), and a field-programmable gate array (FPGA). Further details regarding the processor 610 is provided below.

The processor 610 may control overall operations of the electronic device 600 and execute functions and instructions to be executed within the electronic device 600. The processor 610 may perform operations of a training apparatus described herein (e.g., the training apparatus 200 of FIG. 2). The processor 610 may include a plurality of processors (e.g., GPUs) and perform distributed training of a neural network using the plurality of processors. The processor 610 may perform data processing (e.g., object recognition, object classification, etc.) using a trained neural network obtained through the distributed training.

The memory 620 may store the instructions executable by the processor 610, input/output data, and various neural network parameters. The memory 620 may include a volatile memory and/or a non-volatile memory. The volatile memory device may be implemented as a dynamic random-access memory (DRAM), a static random-access memory (SRAM), a thyristor RAM (T-RAM), a zero capacitor RAM (Z-RAM), or a twin transistor RAM (TTRAM).

The non-volatile memory device may be implemented as an electrically erasable programmable read-only memory (EEPROM), a flash memory, a magnetic RAM (MRAM), a spin-transfer torque (STT)-MRAM, a conductive bridging RAM(CBRAM), a ferroelectric RAM (FeRAM), a phase change RAM (PRAM), a resistive RAM (RRAM), a nanotube RRAM, a polymer RAM (PoRAM), a nano floating gate Memory (NFGM), a holographic memory, a molecular electronic memory device), or an insulator resistance change memory. Further details regarding the memory 620 is provided below.

The camera 630 may capture an image. The camera 630 may obtain, for example, a color image, a black and white image, a gray image, an infrared image, or a depth image. For example, an image captured by the camera 630 may be used as an input to a convolution layer of the neural network.

The sensor 640 may detect an operational state (e.g., power or temperature) of the electronic device 600 or an external environmental state (e.g., a state of a user), and generate an electrical signal or data value corresponding to the detected state. The sensor 640 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, or a humidity sensor, or an illuminance sensor. The sensor 640 may include sensors used to measure various resources of the electronic device 600.

The input device 650 may receive a user input from a user through a tactile, video, audio, gesture, or touch input. The input device 650 may include, for example, a keyboard, a mouse, a touch screen, a microphone, or any other device capable of transmitting a user input to the electronic device 600.

The output device 660 may provide an output of the electronic device 600 to a user through a visual, auditory, or tactile channel. The output device 670 may include, for example, a display devices, such as, a liquid crystal display or a light emitting diode (LED)/organic light emitting diode (OLED) display, a micro LED, a touch screen, a speaker, a vibration generating device, or any other device capable of providing the output to the user. In an example, the output device 650 may also be configured to receive an input from the user, such as, a voice input, a gesture input, or a touch input.

The communication device 670 may support the establishment of a direct (or wired) communication channel or a wireless communication channel between the electronic device 600 and an external electronic device, and support the communication through the established communication channel. According to an example, the communication device 670 may include a wireless communication module (e.g., a cellular communication module, a short-range wireless communication module, or a global navigation satellite system (GNSS) communication module) or a wired communication module (e.g., a local area network (LAN) communication module, or a power line communication module). The wireless communication module may communicate with the external device via a short-range communication network (e.g., Bluetooth™, wireless-fidelity (Wi-Fi) direct, or infrared data association (IrDA)) or a long-range communication network (e.g., a legacy cellular network, a 5G network, a next-generation communication network, the Internet, or a computer network (e.g., a LAN or a wide area network (WAN)).

The computing apparatus 200, processor 210, processor 610, and other apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

The Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method for training a neural network. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque(STT)-MRAM, static random-access memory (SRAM), thyristor RAM (T-RAM), zero capacitor RAM (Z-RAM), twin transistor RAM (TTRAM), conductive bridging RAM(CBRAM), ferroelectric RAM (FeRAM), phase change RAM (PRAM), resistive RAM(RRAM), nanotube RRAM, polymer RAM (PoRAM), nano floating gate Memory(NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus to perform distributed training of a neural network, the apparatus comprising:

processors configured to perform distributed training, wherein each of the processors is further configured to:

perform a forward direction operation for layers of the neural network, determine a loss of the neural network based on a result of the forward direction operation, determine a local gradient for each layer of the neural network by performing a backward direction operation for the layers of the neural network based on the loss, determine whether to perform gradient clipping for a first local gradient for a previous layer, while determining a second local gradient for a current layer following the previous layer and after determining the first local gradient, as part of the backward direction operation, perform the gradient clipping for the first local gradient for the previous layer, determine an aggregated gradient based on results of the backward direction operation and the gradient clipping performed by each of the processors, and update parameters of the neural network based on the aggregated gradient, wherein the processors correspond to graphics processing units (GPUs), and the GPUs are configured to:

exchange at least one of gradients for each of the layers and weights of the neural network before updating the neural network, and generate a trained neural network for object classification, for object recognition, or for speech recognition as a result of the training process, and wherein the gradient clipping for the first local gradient for the previous layer is performed at least partially concurrently with performing of the backward direction operation for the current layer, which includes gradient computation for the current layer.

2. The training apparatus of claim 1, wherein each of the processors is further configured to transmit a final version of the first local gradient for the previous layer to another of the processors, in response to completion of a gradient clipping check process for the first local gradient.

3. The training apparatus of claim 2, wherein each of the processors is further configured to simultaneously determine the second local gradient for the current layer while transmitting the final version of the first local gradient to the other processor.

4. The training apparatus of claim 1, wherein the training apparatus is further configured to determine an average value of local gradients for the each layer of the neural network determined by each of the processors to be the aggregated gradient.

5. The training apparatus of claim 1, wherein each of the processors is further configured to determine whether to perform the gradient clipping based on the first local gradient determined for the previous layer and a threshold.

6. The training apparatus of claim 5, wherein each of the processors is further configured to change the first local gradient for the previous layer to a value corresponding to the threshold, in response to a determination to perform the gradient clipping.

7. The training apparatus of claim 1, wherein the gradient clipping is performed by a processor that is not one of the processors.

8. The training apparatus of claim 1, wherein each of the processors is further configured to perform the gradient clipping based on any one or any combination of a variance value, a momentum value, and a parameter norm value.

9. The training apparatus of claim 1, wherein the processors comprise graphics processing units (GPUs) configured to perform parallel processing.

10. A method for training a neural network, performed by a training apparatus comprising processors, the method comprising:

performing, by each of the processors, a forward direction operation for layers of the neural network;

determining, by each of the processors, a loss of the neural network based on a result of the forward direction operation;

determining, by each of the processors, a local gradient for each layer of the neural network by performing a backward direction operation for the layers of the neural network based on the loss;

determining an aggregated gradient based on the local gradient; and updating parameters of the neural network based on the aggregated gradient, wherein the determining of the local gradient for each of the layers comprises determining whether to perform gradient clipping for a first local gradient for a previous layer, while determining a second local gradient for a current layer following the previous layer and after determining the first local gradient, as part of the backward direction operation, perform the gradient clipping for the first local gradient for the previous layer, and wherein the determining of the aggregated gradient comprises determining the aggregated gradient based on results of the backward direction operation and the gradient clipping performed by each of the processors, wherein the processors correspond to graphics processing units (GPUs), wherein the method further comprises:

exchanging, by each of the processors, at least one of gradients for each of the layers and weights of the neural network before updating the neural network, and generating, by each of the processors, a trained neural network for object classification, for object recognition, or for speech recognition as a result of the training process, and wherein the gradient clipping for the first local gradient for the previous layer is performed at least partially concurrently with performing of the backward direction operation for the current layer, which includes gradient computation for the current layer.

11. The training method of claim 10, wherein the forward direction operation, the backward direction operation, and the gradient clipping are performed by each of the processors in parallel.

12. The training method of claim 10, wherein the determining of the local gradient for each of the layers comprises transmitting a final version of the first local gradient for the previous layer to another processor of the processors, in response to a completion of gradient clipping check process for the first local gradient.

13. The training method of claim 12, wherein the determining of the second local gradient for the current layer and the transmitting of the final version of the first local gradient determined for the previous layer to the another processor are simultaneously performed.

14. The training method of claim 10, wherein the determining of the aggregated gradient comprises determining an average value of local gradients for the each layer determined by each of the processors to be the aggregated gradient.

15. The training method of claim 10, wherein the determining of whether to perform the gradient clipping comprises determining whether to perform the gradient clipping based on the first local gradient determined for the previous layer and a threshold.

16. The training method of claim 15, further comprising changing the first local gradient determined for the previous layer to a value corresponding to the threshold, in response to a determination to perform the gradient clipping.

17. The training method of claim 10, wherein the gradient clipping is performed based on any one or any combination of a variance value, a momentum value, and a parameter norm value.

18. A non-transitory computer-readable storage medium storing instructions that, when executed by a processor, cause the processor to perform the method of claim 11.

19. A method, performed by one or more processors, for distributed training of a neural network, the method comprising:

performing, by each of the one or more processors, a forward direction operation for layers of the neural network to obtain result data;

determining a loss of the neural network based on difference between the result data and validation data;

determining, by each of the one or more processors, respective local gradients for the layers of the neural network by performing a backward direction operation based on the loss;

checking, by each of the one or more processors, whether to perform gradient clipping for a previous layer, while determining a local gradient for a current layer of the layers;

performing the gradient clipping for the previous layer;

transmitting, by each of the one or more processors, a final local gradient for the previous layer to another processor of the one or more processors, in response to the checking being completed;

generating an aggregated gradient based on the final local gradient; and updating parameters of the neural network based on the aggregated gradient, wherein the processors correspond to graphics processing units (GPUs), wherein the method further comprises:

exchanging, by each of the one or more processors, at least one of gradients for each of the layers and weights of the neural network before updating the neural network, and generating, by each of the one or more processors, a trained neural network for object classification, for object recognition, or for speech recognition as a result of the training process, and wherein the gradient clipping for the first local gradient for the previous layer is performed at least partially concurrently with performing of the backward direction operation for the current layer, which includes gradient computation for the current layer.

20. The method of claim 19, wherein the performing of the forward direction operation, the determining of the loss, the determining of the respective local gradients, the checking of whether to perform gradient clipping are performed by the one or more processors in parallel.

21. The method of claim 19, wherein the checking of whether to perform the gradient clipping for the previous layer comprises clipping a local gradient of the previous layer, in response to the local gradient of the previous layer being greater than a high threshold or lesser than a low threshold.

22. The method of claim 19, wherein the generating of the aggregated gradient comprises determining the aggregated gradient based on the average value of the final local gradients received from the one or more processors for the respective layer.

* * * * *